United States Patent
Lehaut et al.

(10) Patent No.: US 6,403,689 B1
(45) Date of Patent: Jun. 11, 2002

(54) DISPERSION OF TITANIUM PARTICLES COMPRISING A BINDER BASED ON POLYORGANSILOXANE

(75) Inventors: Corinne Lehaut, Paris; Denis Cardinaud, Villeurbanne, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/463,201

(22) PCT Filed: Jul. 17, 1998

(86) PCT No.: PCT/FR98/01568
§ 371 (c)(1),
(2), (4) Date: Jan. 19, 2000

(87) PCT Pub. No.: WO99/05231
PCT Pub. Date: Feb. 4, 1999

(30) Foreign Application Priority Data

Jul. 22, 1997 (FR) .............................. 97 09378

(51) Int. Cl.[7] ................................. C08K 3/22
(52) U.S. Cl. .................... 524/431; 255/600; 106/287.1; 106/287.16; 427/387; 428/447
(58) Field of Search ......................... 106/287.16, 287.1; 427/387; 524/431; 428/447; 252/600

(56) References Cited

U.S. PATENT DOCUMENTS 5,547,823 A * 8/1996 Murasawa et al. .......... 430/531
5,755,867 A * 5/1998 Chikuni et al. ........ 106/287.16
6,048,910 A * 4/2000 Furuya et al. ................ 522/86

FOREIGN PATENT DOCUMENTS

| EP | 0 633 064 A1 | 1/1995 | ............ B01J/35/00 |
| EP | 0 792 687 A1 | 9/1997 | ............ B01J/35/02 |
| EP | 0 816 466 A1 | 1/1998 | ............ C09K/3/18 |
| EP | 0 857 770 A2 | 8/1998 | ......... C09D/183/04 |
| FR | 2 431 324 | 2/1980 | ............ B01J/23/44 |
| WO | 95/11751 | * 5/1995 | |
| WO | WO 95/11751 | 5/1995 | ............ B01J/21/06 |
| WO | WO 97/10185 | 3/1997 | ............ C03C/17/00 |
| WO | WO 98/03607 | 1/1998 | ............ C09K/3/18 |

OTHER PUBLICATIONS

Patent Abstracts of Japan vol. 097, No. 008, Aug. 29, 1997, & JP 09 100437 A (Yamagata Pref Cov Techno Porisu Zaidan: Nippon Oil & AMP; Fats Co Ltd) Apr. 15, 1997 (See Abstract).

Patent Abstracts of Japan vol. 097, No. 010, Oct. 31, 1997 & JP 09 152230 A (Sanyo Electric CO. LTD), Jun. 10, 1997 (See Abstract).

* cited by examiner

Primary Examiner—Margaret G. Moore

(57) ABSTRACT

The invention concerns a dispersion of photocatalytic titanium dioxide particles, wherein the liquid phase comprises at least a cross-linking catalyst and at least a polyorganosiloxane either of formula (I) $M_\alpha D_\beta Q_\delta(O_{1/2}R^i)_\epsilon$, or of formula (II): $M\alpha D\beta T\gamma(O1/2R^i)\epsilon$. The invention also concerns the use of this dispersion for treating substrates.

15 Claims, No Drawings

DISPERSION OF TITANIUM PARTICLES COMPRISING A BINDER BASED ON POLYORGANSILOXANE

This application is an application under 35 U.S.C. Section 371 of International Application Number PCT/FR98/01568, filed on Jul. 17, 1998.

The present invention relates to dispersions of particles of photocatalytic titanium dioxide which are capable of being used to treat substrates.

It is known that titanium dioxide makes possible, by its photocatalytic activity, the degradation of organic or biorganic molecules.

If this photocatalytic titanium dioxide is deposited on a support, the surface of this support becomes oxidizing and dirty marks, in particular of organic origin, which are deposited there are destroyed by photooxidation. The surface is said to be self-cleaning.

The deposition of titanium dioxide at the surface of the substrate can be carried out from dispersions of titanium dioxide particles. Use is preferably made of dispersions of particles exhibiting a small size, in particular a nanoparticle size, so as to obtain translucent surfaces, in contrast to micrometric titanium dioxide, which gives white surfaces.

The treated surfaces can be glass, plastics, building materials (mortars, concretes, terracottas), ceramics, stones, paper or wood.

The deposit of titanium dioxide on these supports must adhere strongly to the support for the treated surfaces to be able to be installed and in order for them to retain their self-cleaning properties over time. It is also necessary for the binder which allows the particles to adhere to the support not to be sensitive to the photocatalysis of the titanium dioxide particles.

With this aim, several processes have been employed which provide various types of binders which allow the particles to be adhesively bonded to the substrate.

A first process consists in depositing dispersions of titanium dioxide particles comprising the precursor of a binder on the substrate under hot conditions. For example, provision has been made to use dispersions of titanium dioxide particles and of organometallic binders of titanate or silicate type. The particles are then held in a film of silica or titanium dioxide (this principle is disclosed, for example, in WO 97/10185). This inorganic binder exhibits the advantage of not being photodegradable.

A second process consists in depositing dispersions of titanium dioxide particles comprising an organic binder on the substrate under cold conditions. One problem is that this binder must not degrade under the effect of the photocatalytic properties of the titanium dioxide particles. To achieve this, provision has been made, for example, to choose the binder from silicones.

However, although the silicone binders provided do not degrade on contact with the photocatalytic particles, it is observed that they do not always result in a homogeneous, hard and adherent coating: very often, the coatings obtained can be removed by simple rubbing with the finger.

One aim of the present invention is therefore to provide dispersions of titanium dioxide particles and of a non-photodegradable binder which can be used to form photocatalytic coatings at the substrate surface under cold conditions.

Another aim of the present invention is to provide such dispersions, the use of which results in homogeneous, hard and adherent coatings.

With these aims, the invention relates to a dispersion of particles of photocatalytic titanium dioxide, in which dispersion the liquid phase comprises at least one crosslinking catalyst and at least one polyorganosiloxane, either of formula (I):

$$M_\alpha D_\beta Q_\delta (O_{1/2} R^i)_\epsilon,$$

or of formula (II):

$$M_\alpha D_\beta T_\gamma (O_{1/2} R^i)_\epsilon,$$

as defined hereinbelow.

With these aims, the invention also relates to the use of this dispersion to treat substrates.

The dispersions according to the invention exhibit the advantage of being chemically neutral and of not interacting with the substrates on which they are deposited.

They also exhibit the advantage of employing inexpensive binders.

In addition, they make it possible, under certain conditions of use, to result in transparent or translucent coatings.

The invention relates first of all to a dispersion of particles of photocatalytic titanium dioxide, in which dispersion the liquid phase comprises at least one polyorganosiloxane:

either of mean formula (I):

$$M_\alpha D_\beta Q_\delta (O_{1/2} R^1)_\epsilon,$$

in which:
M=$R^{ii}_3 SiO_{1/2}$
D=$R^{ii}_2 SiO_{2/2}$
Q=$SiO_{4/2}$ with $R^{ii}$, which are identical or different, representing either a linear or branched alkyl radical having from 1 to 8 carbon atoms or a substituted or unsubstituted aryl group having from 6 to 12 carbon atoms or an aralkyl, alkaryl, aryloxyalkyl or alkoxyaryl group in which the aryl group comprises from 6 to 12 carbon atoms, which atoms can optionally be substituted by at least one linear or branched alkyl or alkoxy group having from 1 to 4 carbon atoms, and in which the alkyl or alkoxy group has from 1 to 4 carbon atoms and is linear or branched, α, β and δ respectively represent the molar fractions of the silicon atoms of the M, D and Q units, with α+β+δ=1, and:
α≦0.10, preferably α≦0.010,
β≦0.85,
δ≧0.10, $R^i$, which are identical or different, represent an alkyl group having from 1 to 4 carbon atoms, ε represents the mean number of $O_{1/2} R^i$ units per silicon atom, or of mean formula (II):

$$M_\alpha D_\beta T_\gamma (O_{1/2} R^i)_\epsilon,$$

in which:
M, D, $R^i$ and ε have the above meanings and
T=$R^{ii} SiO_{3/2}$, with $R^{ii}$ having the same meaning as above, α, β and γ respectively represent the molar fractions of the silicon atoms of the M, D and T units, with α+β+γ=1, and:
α≦0.20, preferably α≦0.010,
β≦0.60,
γ≧0.30.

Preferably, the polyorganosiloxane of the dispersion has the formula (I) or (II) and $R^i$ is an ethyl or methyl group. On average, the polyorganosiloxane can also exhibit silanol ends ($R^i$=H), the said ends not representing more than 20% of all the ends.

According to a first preferred alternative form, the dispersion according to the invention comprises a polyorganosiloxane of formula (II) in which:

for each unit T=$R^{ii}SiO_{3/2}$, $R^{ii}$ is a methyl,
for each unit D=$R^{ii}_2SiO_{2/2}$, one $R^{ii}$ substituent is a methyl and the other $R^{ii}$ substituent is an octyl,
β has a value of at most 0.10,
γ has a value of at least 0.70.

According to a second preferred alternative form, the dispersion according to the invention comprises a polyorganosiloxane of formula (II) in which:

for each unit T=$R^{ii}SiO_{3/2}$, $R^{ii}$ is a methyl,
for each unit D=$R^{ii}_2SiO_{2/2}$, the two $R^{ii}$ substituents are methyls,
β has a value of at most 0.30,
γ has a value of at least 0.70.

According to a third preferred alternative form, the dispersion according to the invention comprises a polyorganosiloxane of formula (II) in which:

for each unit T=$R^{ii}SiO_{3/2}$, $R^{ii}$ is a propyl,
for each unit D=$R^{ii}_2SiO_{2/2}$, the two $R^{ii}$ substituents are methyls,
β has a value of at most 0.40,
γ has a value of at least 0.40.

The dispersions according to the invention can also comprise a crosslinking catalyst. The latter can be chosen from organic titanium compounds (for example, alkyl titanates) or organic tin compounds (for example, dialkyltin dicarboxylate).

Alkyl titanates are preferred.

The use of this catalyst is recommended for the use of the dispersion during the treatment of glass substrates.

The liquid phase of the dispersion according to the invention may comprise only a polyorganosiloxane as defined above or else may also comprise a solvent.

The solvent of the liquid phase of the dispersion according to the invention can be aqueous or organic.

It is generally an organic solvent. The solvent can be chosen from the solvents for the silicone polymers used, such as, for example, D4 (octamethylcyclotetrasiloxane) or other volatile siloxanes, white spirit, $C_1$–$C_8$ alcohols, or aliphatic or aromatic hydrocarbons, such as cyclohexane or alkanes.

The choice of the solvent is made according to its compatibility with the polyorganosiloxane. It is thus possible to vary the transparency of the final coating.

The dispersion according to the invention preferably comprises a solvent, in particular when it is desired to decrease the concentration of titanium dioxide in the coating in order to obtain coatings of greater translucency or greater transparency.

The photocatalytic particles of the dispersion according to the invention are preferably titanium dioxide particles exhibiting a size of at most 100 nm, in particular of between 10 and 50 nm. The diameters are measured by transmission electron microscopy (TEM).

The nature of the crystalline phase is, preferably, predominantly the anatase crystalline form. "Predominantly" means that the level of anatase in the titanium dioxide particles is greater than 50% by mass. The particles preferably exhibit a level of anatase of greater than 80%.

The degree of crystallization and the nature of the crystalline phase are measured by X-ray diffraction.

It is preferable to use monodisperse titanium dioxide particles in order to obtain coatings of greater transparency. Monodisperse is understood to mean particles exhibiting a dispersion index of at most 0.5, preferably of at most 0.3, the dispersion index being given by the following formula:

$$I = \frac{\phi_{84} - \phi_{16}}{2\phi_{50}}$$

in which:
$\phi_{84}$ is the diameter of the particles for which 84% by weight of the particles have a diameter of less than $\phi_{84}$,
$\phi_{16}$ is the diameter of the particles for which 16% by weight of the particles have a diameter of less than $\phi_{16}$,
$\phi_{50}$ is the mean diameter of the particles.

The diameters of use in the determination of the dispersion index are measured by centrifugal sedimentation of the particles of the dispersion, monitored by X-rays, using a Brookhaven-type XDC device.

The monodisperse particles of the dispersion preferably result from a so-called solution or wet-route preparation process (thermolysis, thermal hydrolysis or precipitation of a titanium salt), in contrast to processes for the high-temperature pyrolysis or oxidation of a titanium salt. They can be, for example, titanium dioxide particles obtained by the process described in Application EP-A-0,335,773.

It can in particular be the preparation process which consists in hydrolysing at least one titanium compound A in the presence of at least one compound B chosen from:

(i) acids which exhibit:
either a carboxyl group and at least two hydroxyl and/or amine groups,
or at least two carboxyl groups and at least one hydroxyl and/or amine group, (ii) organic phosphoric acids of following formulae:

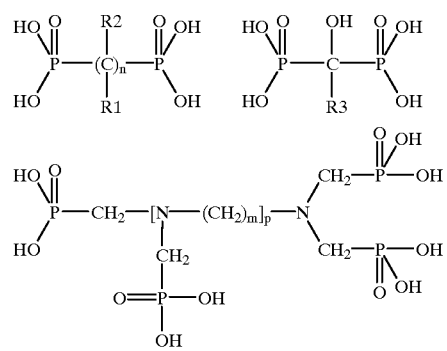

in which n and m are integers of between 1 and 6 and p is an integer of between 0 and 5, R1, R2 and R3, which are identical or different, representing a hydroxyl, amino, aralkyl, aryl or alkyl group or hydrogen, (iii) compounds capable of releasing sulphate ions in acidic medium, (iv) salts of the acids described above, and in the presence of anatase titanium dioxide seeds exhibiting a size of at most 5 nm and in a ratio by weight of $TiO_2$ present in the seeds/titanium present before introduction of the seeds in the hydrolysis medium, expressed as $TiO_2$, of between 0.01% and 3%.

This process for the preparation of the particles thus comprises several stages and, firstly, a stage of preparation of the starting solution comprising a titanium compound A, a compound B as defined above and titanium dioxide seeds.

This starting solution, intended to be hydrolysed, is preferably completely aqueous; another solvent, for example an alcohol, can optionally be added, provided that the titanium compound A and the compound B used are then substantially soluble in this mixture.

As regards the titanium compound A, use is generally made of a compound chosen from halides, oxyhalides or alkoxides of titanium, sulphates and more particularly synthetic sulphates.

Synthetic sulphates is understood to mean titanyl sulphate solutions produced by ion exchange from very pure titanium chloride solutions or by reaction of sulphuric acid with a titanium alkoxide.

The preparation is preferably carried out with titanium compounds of the titanium halide or oxyhalide type. The titanium halides or oxyhalides which are more particularly used in the present invention are titanium fluorides, chlorides, bromides and iodides (respectively oxyfluorides, oxychlorides, oxybromides-and oxyiodides).

According to a particularly preferred form, the titanium compound is titanium oxychloride $TiOCl_2$.

The amount of titanium compound A present in the solution to be hydrolysed is not critical.

The initial solution additionally comprises at least one compound B as defined above. Mention may be made, as non-limiting examples of compounds B coming within the scope of the present invention, of in particular:

hydroxypolycarboxylic acids and more particularly hydroxydi- or hydroxytricarboxylic acids, such as citric acid, maleic acid and tartaric acid, (polyhydroxy)monocarboxylic acids, such as, for example, glucoheptonic acid and gluconic acid, poly(hydroxycarboxylic) acids, such as, for example, tartaric acid, dicarboxylic amino acids and their corresponding amides, such as, for example, aspartic acid, asparagine and glutamic acid, hydroxylated or non-hydroxylated monocarboxylic amino acids, such as, for example, lysine, serine and threonine, aminotri(methylenephosphonate), ethylenediaminotetra(methylenephosphonate), triethylenetetraaminohexa(methylenephosphonate), tetraethylenepentaaminohepta(methylenephosphonate) or pentaethylenehexaaminoocta(methylenephosphonate), methylenediphosphonate, 1,1-ethylenediphosphonate, 1,2-ethylenediphosphonate, 1,1-propylenediphosphonate, 1,3-propylenediphosphonate, 1,6-hexamethylenediphosphonate, 2,4-dihydroxypentamethylene-2,4-diphosphonate, 2,5-dihydroxyhexamethylene-2,5-diphosphonate, 2,3-dihydroxybutylene-2,3-diphosphonate, 1-hydroxybenzyl-1,1-diphosphonate, 1-aminoethylene-1,1-diphosphonate, hydroxymethylenediphosphonate, 1-hydroxyethylene-1,1-diphosphonate, 1-hydroxy-propylene-1,1-diphosphonate, 1-hydroxybutylene-1,1-diphosphonate or 1-hydroxyhexamethylene-1,1-diphosphonate.

As already indicated, it is also possible to use, as compound B, all the salts of the abovementioned acids. In particular, these salts are either alkali metal salts, more particularly sodium salts, or ammonium salts.

These compounds can also be chosen from sulphuric acid and ammonium or potassium sulphates.

The compounds B as defined above are preferably hydrocarbonaceous compounds of aliphatic type. In this case, the length of the main hydrocarbonaceous chain preferably does not exceed 15 carbon atoms and more preferably 10 carbon atoms.

The amount of compound B is not critical. The molar concentration of the compound B with respect to that of the titanium compound A is generally between 0.2 and 10% and preferably between 1 and 5%.

Finally, the starting solution comprises titanium dioxide seeds used in a specific way.

First of all, the titanium dioxide seeds used in the present invention must exhibit a size of at most 5 nm, measured by X-ray diffraction. Use is preferably made of titanium dioxide seeds exhibiting a size of between 3 and 5 nm.

Subsequently, the ratio by weight of the titanium dioxide present in the seeds to the titanium present in the hydrolysis medium before introduction of the seeds (that is to say contributed by the titanium compound A) and expressed as $TiO_2$ is between 0.01 and 3%. This ratio can preferably be between 0.05 and 1.5%. The bringing together of these two conditions with respect to the seeds (size and ratio by weight), in combination with the process as described above, makes it possible to precisely control the final size of the titanium dioxide particles, a level of seeds being associated with a particle size. It is thus possible to obtain particles for which the size varies between 5 and 100 nm.

Use is made of titanium dioxide seeds in the anatase form, so as to induce precipitation of the titanium dioxide in the anatase form. Generally, due to their small size, these seeds instead exist in the form of poorly crystallized anatase. The seeds are generally provided in the form of an aqueous suspension composed of titanium dioxide. They can be obtained in a known way by a process of neutralization of a titanium salt by a base.

The following stage consists in hydrolysing this starting solution by any means known to a person skilled in the art and generally by heating. In the latter case, the hydrolysis can preferably be carried out at a temperature greater than or equal to 70° C. It is also possible to operate, firstly, at a temperature below the boiling temperature of the medium and, then, to maintain the hydrolysis medium level at the boiling temperature.

Once hydrolysis has been carried out, the titanium dioxide particles obtained are recovered by separation of the precipitated solid from the mother liquors. They are then redispersed in an aqueous liquid medium so as to obtain a titanium dioxide dispersion. This liquid medium can be acidic or basic.

It has been observed that the titanium dioxide particles resulting from a so-called solution or wet-route preparation process, and in particular resulting from the process described above with hydrolysis at a temperature of approximately 100° C., exhibit, because of their porosity, a lower refractive index than the titanium dioxide particles resulting from other processes. This property is of great interest when the particles are used to prepare a coating on a glass substrate, because the coating obtained also exhibits a low refractive index. This optical advantage is important because a layer of titanium dioxide with a high index results in an increase in the light reflection of the carrier glass and thus in a decrease in its light transmission. In point of fact, in certain applications, in particular in the field of glazings for installation in vehicles, it is essential to have high light-transmission levels (for a windscreen, a minimum light transmission of 75% is necessary).

The particles of the dispersion preferably exhibit a BET specific surface of at least 70 $m^2/g$.

BET specific surface is understood to mean the specific surface determined by nitrogen adsorption in accordance with ASTM Standard D 3663-78, drawn up from the Brunauer-Emmett-Teller method described in the periodical "The Journal of the American Chemical Society", 60, 309 (1938). In order to measure the specific surface of the particles according to the invention when they are provided in the form of a dispersion, it is essential to follow the measuring protocol, which consists in removing the liquid phase from the dispersion and in then drying the particles under vacuum at a temperature of 150° C. for at least 4 hours.

The particles of the dispersion preferably also exhibit a relative density of the order of 2.4. "Of the order" is understood to mean that the relative density is 2.4±0.2. Such a relative density value is low with respect to the conventional relative density of anatase titanium dioxide, which is 3.8. This relative density is evaluated by measurement of the pore volumes.

These specific surface and relative density features can be obtained for the titanium dioxide particles resulting from a so-called solution or wet-route preparation process and in particular resulting from the process described above with hydrolysis at a temperature of approximately 100° C.

The proportions of the particles to the polyorganosiloxane of the dispersion according to the invention vary with the use which is made thereof. Thus, for the application of the dispersion as a coating on concrete, the proportion of the particles generally represents at least 5% by weight of the particles+polyorganosiloxane mixture; on the other hand, for the application of the dispersion as a coating on glass, the proportion of the particles generally represents at least 10% by weight of the particles+polyorganosiloxane+optional crosslinking catalyst mixture, preferably at least 50% and generally at most 90%.

The solvent of the dispersion according to the invention is generally present in an amount such that the solids content, as titanium dioxide particles, is at least 0.5% by weight.

If a crosslinking catalyst is present in the dispersion, it generally represents at least 5% by weight of the polyorganosiloxane+catalyst mixture and preferably at most 50% by weight.

The invention also relates to the process for the preparation of the above dispersions, which consists in simply mixing the titanium dioxide particles and the polyorganosiloxane.

The polyorganosiloxanes which can be employed in the dispersion are known and commercially available.

The titanium dioxide particles can also be obtained commercially. They can be provided in various forms.

They may first of all be aqueous dispersions of titanium dioxide particles, such as those sold by Rhône-Poulenc under the name S5-300, or dispersions obtained according to the process disclosed in Patent EP-A-0 335 773, as described above.

Use is preferably made of basic aqueous dispersions, as it has been observed that the latter result in dispersions which give coatings of greater transparency than acidic aqueous dispersions. In the case of deposition on glass, this difference can be reduced if the glass is activated with NaOH before deposition.

They may also be organic dispersions of titanium dioxide particles. These can be prepared from aqueous dispersions of titanium dioxide particles, the phase transfer being carried out, for example, according to one of the following methods:

washing with acetone or the desired solvent by centrifuging and redispersing in the organic solvent, azeotropic distillation of the water/solvent mixture, if the water and the solvent are immiscible and form an azeotrope, evaporation of the water on a rotary evaporator, if the solvent is miscible with water and boils at a temperature greater than that of water, mixing an aqueous dispersion with an organic medium comprising a cationic transfer agent, if the particles are negatively charged, it being possible for the transfer agent to be chosen in particular from quaternary amines or quaternary ammonium salts, or a medium comprising an anionic transfer agent, if the particles are positively charged (this process is described more particularly in Patent GB-A-988,330).

Use may also be made of titanium dioxide powders. Such powders are commercially available; mention may be made of the G5 or DT51D powders sold by Rhodia Chimie. Powders can also be obtained by atomization of an aqueous dispersion as described above.

The dispersions according to the invention are preferably prepared from particles in the form of dispersions, in particular when it is desired to obtain a transparent surface treatment, powders generally resulting in coatings of reduced transparency.

The invention also relates to the use of the above dispersions in treating the surface of a substrate.

The polyorganosiloxane acts as binder in order to attach the particles to the substrate.

The substrate can be of various kinds: it may be, for example, glass, polymers (plastics), building materials, such as mortars, concretes or terracottas, ceramics, stones, wood, metals or paper.

In the case of the treatment of alkaline substrates and in particular of concrete, use is preferably made of the dispersion defined in the third alternative form hereinabove, namely that comprising at least one polyorganosiloxane of formula (II) in which:

for each unit $T=R^{ii}SiO_{3/2}$, $R^{ii}$ is a propyl, for each unit $D=R^{ii}{}_2SiO_{2/2}$, the two $R^{ii}$ substituents are methyls, $\beta$ has a value of at most 0.40, $\gamma$ has a value of at least 0.40.

If the polyorganosiloxanes exhibit intrinsic properties, such as, for example, protection of the substrates (water repellency and the like), it has been observed that the fact of mixing them with the titanium dioxide particles does not modify their properties. This is the case, for example, with the coating employing polyorganosiloxane of the third preferred alternative form, which makes it possible to obtain a coating which adheres firmly to the alkaline substrate and, furthermore, provides a water repellency property specific to this type of polyorganosiloxane binder.

Deposition can be carried out by any conventional method: roller, brush, spray gun, spray.

The following examples illustrate the invention without, however, limiting the scope thereof.

EXAMPLES

Example 1

Preparation of a Polyorganosiloxane of Formula (I)

4 mol (609 g) of methyl orthosilicate, 3 mol (890 g) of octamethylcyclotetrasiloxane, 1.6 g of an aqueous potassium hydroxide solution comprising 39% of potassium hydroxide, and 72 g of water are placed in a jacketed cylindrical glass reactor with a capacity of 2 liters equipped with an anchor stirrer. The mass is heated to 70° C. and a temperature stationary phase is maintained at 70±3° C. for 6 h. The reaction mixture is subsequently cooled and then 0.41 g of hydrochloric acid, as a 30% by weight aqueous solution, is added. The reaction mass is finally [lacuna] in the presence of a filter aid (Clarcel).

1247 g of silicone oil are obtained, which oil has a kinematic viscosity of 1.32 mm²/s and a mean formula (determined by $^{29}$Si NMR) of:

$(Me_2SiO_{2/2})_{0.80}(SiO_{4/2})_{0.20}(O_{1/2}Me)_{0.74}$

Example 2

Preparation of a Polyorganosiloxane of Formula (II)

3.5 mol of dimethyldichlorosilane and 3.5 mol of propyltrichlorosilane are charged to a 2 litre reactor. The temperature is brought to 60° C. and then an ethanol/water mixture (6.12 mol of ethanol/6.6 mol of water) is run in over 2 hours with stirring and heating at 80° C. The acidic ethanol is subsequently removed by distillation for 1 h 50 at 120° C.

The residual chlorines are subsequently removed by washing with 166 g of ethanol and 5.7 g of water (in order to adjust to the desired viscosity) and then distillation is carried out for 1 h 05 at 120° C. Cooling is carried out to 100° C. and neutralization is carried out with sodium bicarbonate (11.1 g) at 100° C. for 1 h. 515 g of resin are obtained after filtration.

This resin has a kinematic viscosity of 87.7 mm²/s at 25° C.

By $^{29}$Si NMR, the mean formula of this polyorganosiloxane is as follows (determined by $^{29}$Si NMR:

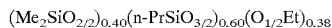

$(Me_2SiO_{2/2})_{0.40}(n\text{-}PrSiO_{3/2})_{0.60}(O_{1/2}Et)_{0.38}$

Example 3

Preparation of a Polyorganosiloxane of Formula (II)

A round-bottomed glass flask, which is stirred with a paddle stirrer, is equipped with a reflux condenser and is inert under nitrogen, has charged to it 282 g of absolute ethanol and 0.30 g of potassium silanolate, obtained by reaction of aqueous potassium hydroxide, octamethylcyclotetrasiloxane and hexamethyldisiloxane, known under the name Rhodorsil Cata 104. This catalyst comprises as many moles of silanolates as a 12% potassium hydroxide solution. The mass is heated to 65° C. and then the introduction is begun of a flow of a polymethylhydrosiloxane with trimethylsilyl ends, with a mean degree of polymerization of 50. 200 g of this polymer are run in over 4 h 30. The temperature rises to 75° C., which temperature is maintained for 3 h after the polymethylhydrosiloxane has finished being run in. After cooling the mass, neutralization is carried out with 0.59 g of Solution 110, a silylated ester of phosphoric acid prepared by Rhône-Poulenc Silicones. Evaporation is then carried out using a rotary evaporator under 5 mm Hg and at 70° C.

294 g of a polymer are recovered, which polymer has a viscosity of 30 mm²/s at 25° C.

By $^{29}$Si NMR, the mean formula of this polyorganosiloxane is as follows:

$(Me_3SiO_{1/2})_{0.04}(MeSiO_{3/2})_{0.96}(O_{1/2}Et)_{0.96}$

Example 4

Preparation of a Comparative Polyorganosiloxane 300 ml of ethanol, dried beforehand over a 3 angström molecular sieve, and 10 microliters of Karstedt catalyst (10% in hexane) are charged, under a nitrogen atmosphere, to a 500 ml three-necked round-bottomed flask equipped with a mechanical stirrer, a thermometer and a dropping funnel. The mixture is stirred at 65° C. and the dropwise addition is begun of the polymethylhydrosiloxane (40 g, mean degree of polymerization $DP_n=50$). A significant evolution of hydrogen is observed. The rate at which the Si—H fluid is run in is adjusted in order to control the hydrogen flow rate and the exothermicity of the reaction. After the polymethylhydrosiloxane has finished being run in, the mixture is left stirring for one hour.

36 g of 1-octene are then run in dropwise. After addition, the reaction mixture is heated at 60° C. until all the Si—H functional groups have been consumed. The excess alcohol and octene are subsequently evaporated. 80 g of clear and slightly coloured oil are recovered. $^{29}$Si NMR analysis reveals the following structure:

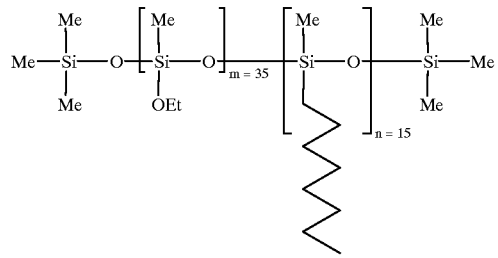

Example 5

Preparation of a Basic Aqueous Dispersion of Titanium Dioxide Particles

An aqueous dispersion of titanium dioxide nanoparticles is prepared according to the teaching of Patent Application EP-A-0 335 773, in the presence of seeds.

The following are successively added to 394.7 g of a 1.9 mol/kg titanium oxychloride solution A:

42.02 g of 36% HCl 4.73 g of citric acid 547.1 g of purified water 11.36 g (0.2% by weight with respect to the titanium of the solution A, expressed as $TiO_2$) of dispersed anatase seeds, with a $TiO_2$ assay of 10 g/kg and exhibiting a size of between 5 and 6 nm, added when the temperature reaches 75° C. This temperature is maintained for 2 h.

The mixture is brought to boiling point (0.8° C./min) and is maintained there for 3 h.

The solution is subsequently separated by settling, reslurried and neutralized to pH=6 and washed until the chlorides and Na$^+$ ions are removed.

The particles are then redispersed with NaOH to pH=9 and to a solids content of approximately 12%.

The size, measured by TEM, is 45 nm. XDC analysis shows a monopopulation free from agglomerates and the dispersion index is 0.2.

X-ray analysis shows that the particles are 80% by weight in the anatase $TiO_2$ form. They are porous, with a relative density of 2.54 g/cc.

Example 6

Preparation of a Basic Aqueous Dispersion of Titanium Dioxide Particles

An aqueous dispersion of titanium dioxide nanoparticles is prepared according to the teaching of Patent Application EP-A-0 335 773, in the presence of seeds.

The following are successively added to 394.7 g of a 1.9 mol/kg titanium oxychloride solution A:
- 42.02 g of 36% HCl
- 4.73 g of citric acid
- 501.7 g of purified water
- 56.8 g (1% by weight with respect to the titanium of the solution A, expressed as $TiO_2$) Of dispersed anatase seeds, with a $TiO_2$ assay of 10 g/kg and exhibiting a size of between 5 and 6 nm, added when the temperature reaches 75° C. This temperature is maintained for 2 h.

The mixture is brought to boiling point (0.8° C./min) and is maintained there for 3 h.

The solution is subsequently separated by settling, reslurried and neutralized to pH=6 and washed until the chlorides and $Na^+$ ions are removed.

The particles are then redispersed with NaOH to pH=9 and to a solids content of approximately 12%.

The size, measured by TEM, is 25 nm.

X-ray analysis shows that the particles are 80% by weight in the anatase $TiO_2$ form.

Example 7

Preparation of an Organic Dispersion of Titanium Dioxide Particles 200 g of the dispersion of Example 5, the solids content of which has been reduced to 10%, are introduced into a round-bottomed flask. 180 g of octamethylcyclotetrasiloxane (D4), to which 15 g of isostearic acid have been added beforehand, are added. Heating is subsequently carried out in order to carry out distillation on a Vigreux column. An azeotrope is distilled at 97° C. with a water/D4 composition of approximately 40/60. The D4 is recycled to the round-bottomed flask. After 3 hours, a suspension of $TiO_2$ in D4 is obtained with a solids content of 10%.

Example 8

Synthesis of Dispersions of Titanium Dioxide Particles and of Polyorganosiloxane Binders Dispersions are prepared from the polyorganosiloxanes of Examples 1 to 4 and from the titanium dioxide dispersions of Examples 5 to 7 or from a commercial S5-300 titanium dioxide dispersion.

8.1. Dispersion 1 (Comparative)

An acidic S5-300 dispersion ($HNO_3$, pH=1) is used. XDC analysis shows that the particles are agglomerate-free monopopulated particles and their dispersion index is 0.41. Measurement of the size of the particles by TEM gives 45 nm. Their BET specific surface (measured according to the protocol defined above) is greater than 250 $m^2/g$. The crystalline structure, measured by X-ray analysis, is anatase.

This dispersion, reduced to a solids content of 10%, is mixed with the polyorganosiloxane of Example 4 in the proportions by mass 82.4% titanium dioxide and 17.6% polyorganosiloxane.

This mixture is subsequently deposited on a glass substrate.

Deposition is carried out with a brush on glass plates which have been washed beforehand with acetone and then dried in the air. The coating is subsequently allowed to dry freely in the air.

The film obtained is non-homogeneous, white and non-adherent: it is removed by simply passing the finger over the glass plate.

8.2. Dispersion 2 (According to the Invention)

The S5-300 dispersion described above, reduced to a solids content of 10%, is mixed with a mixture M1 based on the polyorganosiloxane of Example 1, the said mixture comprising:
- 5% by weight of the polyorganosiloxane of Example 1,
- 5% by weight of poly(propyl silicate),
- 1% by weight of butyl titanate,
- 89% by weight of Petrol E.

Poly(propyl silicate) is understood to mean the poly (propyl silicate) of mean formula $(SiO_2)(O_{1/2}\text{n-Pr})_{2.04}$ prepared by the process of acid hydrolysis, using HCl, of propyl orthosilicate, followed by neutralization with sodium bicarbonate and filtration. It is a binder.

Petrol E is a fraction formed of aliphatic hydrocarbons with boiling points of between 96 and 113° C. at standard pressure.

The S5-300 dispersion and the mixture M1 are mixed in the proportions by mass of 20.1% titanium dioxide and 79.9% polyorganosiloxane of Example 1+butyl titanate.

This mixture obtained is subsequently diluted with isopropanol, so as to obtain a dispersion exhibiting a solids content of 1.3% by weight of titanium dioxide.

Deposition is carried out on a glass plate as for Dispersion 1.

The film obtained is homogeneous, translucent but slightly off-white, and hard (the pencil hardness at 1 week is 5 H).

8.3. Dispersion 3 (According to the Invention)

The basic titanium dioxide dispersion of Example 6 is used.

This dispersion is mixed with the above mixture M1.

The dispersion and the mixture M1 are mixed in the proportions by mass of 20.1% titanium dioxide and 79.9% polyorganosiloxane of Example 1+butyl titanate.

The mixture obtained is subsequently diluted with isopropanol, so as to obtain a dispersion exhibiting a solids content of 0.75% by weight of titanium dioxide.

Deposition is carried out on a glass plate as above.

The film obtained is homogeneous and translucent (it is possible to read through it). The pencil hardness at 1 week is 7 H.

The photocatalytic activity of this film was measured. The photooxidation test consists in monitoring the degradation of isobutane gas brought into contact with the glass treated according to the invention.

To do this, the test glass and an amount of isobutane equal to 20% of the total volume of the reactor are introduced into a reactor. The test device is composed of a turntable rotating around from 1 to 6 low-pressure U.V.A. lamps exhibiting an emission maximum between 300 and 400 nm. The reactors comprising the glasses to be evaluated are placed in the turntable, the face of the glass to be evaluated on the side of the U.V.A. radiation. Depending on their position and the number of lamps switched on, each glass receives U.V.A. irradiation ranging up to 30 $W/m^2$. The irradiation lasts 8 to 22 hours. The progress of the photodecomposition of the isobutane is subsequently determined quantitatively, using a gas chromatograph, by monitoring the amount of $O_2$. This progress is expressed using the rate constant for disappearance of the $O_2$ in $mol/h/cm^2$.

This test, carried out on the polyorganosiloxane alone in the presence of air, shows no consumption of $O_2$: the resin does not degrade under UVA radiation.

The test, when carried out on the resin in the presence of $TiO_2$ and air, still does not show consumption of $O_2$: the resin does not photodegrade under UVA radiation.

In the presence of isobutane and air, the plate comprising resin and TiO$_2$ shows a consumption of 1 to 1.5%. of O$_2$ over 17 h, which reflects a photocatalytic activity of the plate.

8.4. Dispersion 4 (According to the Invention)

The dispersion of particles of Example 6 is mixed with a mixture M2 based on the polyorganosiloxane of Example 3, the said mixture comprising:

7% by weight of the polyorganosiloxane of Example 3,

5% by weight of butyl titanate,

88% by weight of hexamethyldisiloxane.

The dispersion of Example 6 and the mixture M2 are mixed in the proportions by mass of 15% titanium dioxide and 85% polyorganosiloxane of Example 3+butyl titanate.

Deposition is carried out on a glass plate as above.

The film obtained is homogeneous, translucent (it is possible to read through it) and hard.

8.5. Dispersion 5 (According to the Invention)

The titanium dioxide dispersion of Example 7 is used.

A dispersion according to the invention is prepared comprising the polyorganosiloxane of Example 2 diluted to 8% by weight in white spirit and 1% by weight of TiO$_2$ with respect to the total.

This dispersion is sprayed in a proportion of 200 g/m$^2$ onto a concrete slab, onto which has been sprayed beforehand the titanium dioxide dispersion of Example 7 with a solids content of 1% by weight, also at 200 g/m$^2$.

The film obtained is homogeneous and adherent. The colour of the concrete is not detrimentally affected by the film.

It is observed that the coating exhibits water-repellency properties equivalent to those of the polyorganosiloxane alone: water uptake by the concrete is as low by treatment of the concrete with the polyorganosiloxane alone as by treatment with the dispersion according to the invention.

What is claimed is:

1. A dispersion in a liquid phase of particles of photocatalytic titanium dioxide, said liquid phase comprising at least one polyorganosiloxane of mean formula (I):

$$M_\alpha D_\beta Q_\delta (O_{1/2}R^i)_\epsilon,$$

wherein:

$M = R^{ii}_3 SiO_{1/2}$ $D = R^{ii}_2 SiO_{2/2}$ $Q = SiO_{4/2}$ wherein $R^{ii}$, which are identical or different, represent either a linear or branched alkyl radical having from 1 to 8 carbon atoms or an optionally substituted aryl group having from 6 to 12 carbon atoms or an aralkyl, alkaryl, aryloxyalkyl or alkoxyaryl group in which the aryl group comprises from 6 to 12 carbon atoms, optionally said atoms being substituted by at least one linear or branched alkyl or alkoxy group having from 1 to 4 carbon atoms, and in which the alkyl or alkoxy group has from 1 to 4 carbon atoms and is linear or branched;

α, β and δ respectively represent the molar fractions of the silicon atoms of the M, D and Q units, with α+β+δ=1, and:

α≦0.10

β≦0.85, and

δ≦0.10, $R^i$, which are identical or different, represent an alkyl group having from 1 to 4 carbon atoms, and ε represents the mean number of $O_{1/2}R^i$ units per silicon atom.

2. A dispersion according to claim 1, wherein α≦0.010.

3. A dispersion according to claim 1, wherein $R^i$ is an ethyl or methyl group.

4. A dispersion according to claim 1, wherein the liquid phase comprises a crosslinking catalyst.

5. A dispersion according to claim 4, wherein the crosslinking catalyst is an organic titanium compound or an organic tin compound.

6. A dispersion according to claim 5, wherein the crosslinking catalyst is an alkyl titanate or a dialkyltin dicarboxylate.

7. A dispersion according to claim 1, wherein the liquid phase further comprises an organic solvent which is a solvent for said polyorganosiloxane.

8. A dispersion according to claim 7, wherein the solvent is octamethylcyclotetrasiloxane, white spirit, a C$_1$–C$_8$ alcohol, an aliphatic hydrocarbon, or an aromatic hydrocarbon.

9. A dispersion according to claim 1, wherein the particles are titanium dioxide particles having a size of at most 100 nm.

10. A dispersion according to claim 1, wherein the proportions of the particles to the polyorganosiloxane are such that the particles represent at least 5% by weight of the weight of the particles and the polyorganosiloxane.

11. A dispersion according to claim 1, comprising at least 5% by weight of crosslinking catalyst with respect to the weight of the polyorganosiloxane and the catalyst.

12. A process for the preparation of a dispersion as defined in claim 1, comprising the step of mixing the titanium dioxide particles and the polyorganosiloxane.

13. A process for treating a surface of a substrate comprising the step of coating said surface with a dispersion as defined in claim 1.

14. A process according to claim 13, wherein said substrate is an alkaline substrate.

15. A process according to claim 13, wherein said substrate is concrete.

* * * * *